United States Patent [19]
Wright

[11] 4,026,394
[45] May 31, 1977

[54] VEHICLE SHOE-DRUM BRAKES OF THE DUO-SERVO TYPE

[75] Inventor: Andrew Charles Walden Wright, Lapworth, England

[73] Assignee: Girling Limited, Birmingham, England

[22] Filed: June 5, 1975

[21] Appl. No.: 584,044

[30] Foreign Application Priority Data
June 5, 1974 United Kingdom ............ 24861/74

[52] U.S. Cl. .................. 188/331; 188/79.5 GC; 188/196 BA
[51] Int. Cl.² ................................ F16D 65/52
[58] Field of Search .......... 188/79.5 GE, 79.5 K, 188/79.5 P, 196 BA, 196 B, 106 A, 331, 325, 346, 343, 79.5 GC, 79.5 SC, 79.5 S

[56] References Cited
UNITED STATES PATENTS

| | | | |
|---|---|---|---|
| 1,824,552 | 9/1931 | Khezarjian | 188/79.5 GC |
| 1,926,379 | 9/1933 | Goepfrich | 188/79.5 SC |
| 1,954,540 | 4/1934 | Sanford | 188/79.5 GC |
| 2,132,049 | 10/1938 | Schlumbrecht | 188/79.5 R |
| 3,184,008 | 5/1965 | Winge et al. | 188/79.5 GC |
| 3,381,779 | 5/1968 | Newstead | 188/79.5 SC |
| 3,780,836 | 12/1973 | Newstead | 188/196 BA X |
| 3,799,295 | 3/1974 | Hill | 188/79.5 GC |
| 3,915,265 | 10/1975 | Farr | 188/196 BA X |

Primary Examiner—Trygve M. Blix
Assistant Examiner—Douglas C. Butler
Attorney, Agent, or Firm—Scrivener Parker Scrivener & Clarke

[57] ABSTRACT

In an internal shoe-drum brake of the duo-servo type a strut assembly with which non-actuated shoe ends engage is slidably guided in an open-ended through bore in a fixed housing and the length of the strut assembly is substantially greater than the maximum transverse dimension thereof.

12 Claims, 7 Drawing Figures

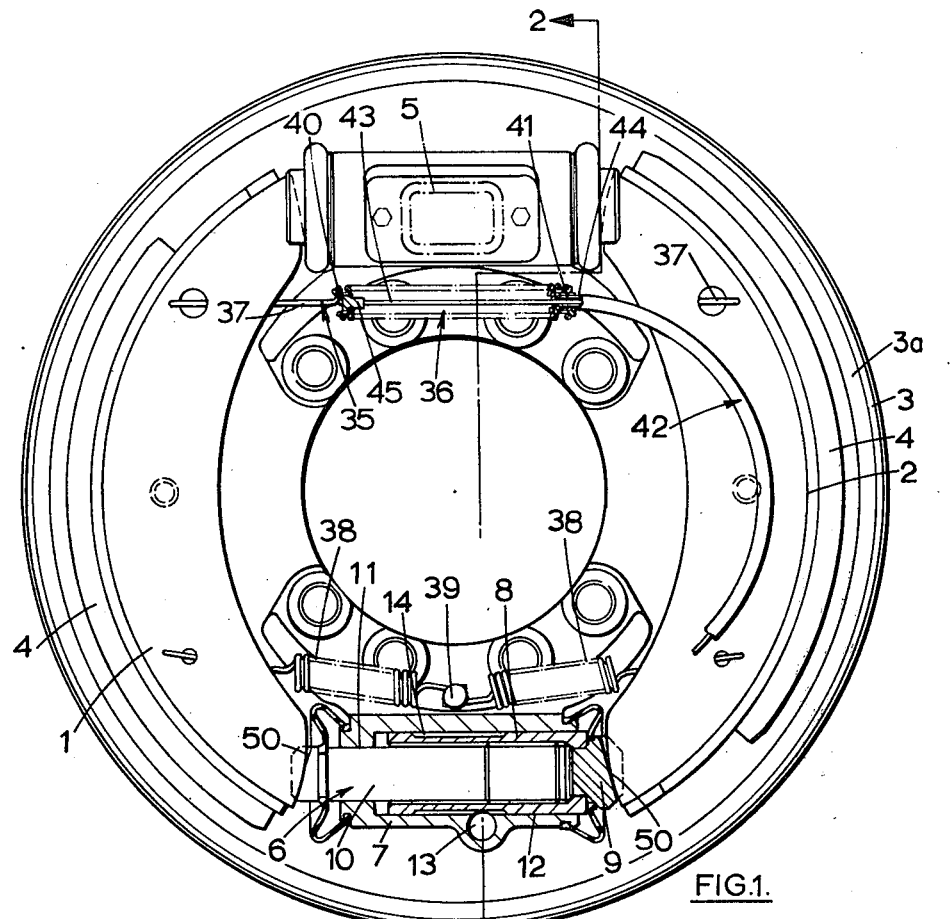
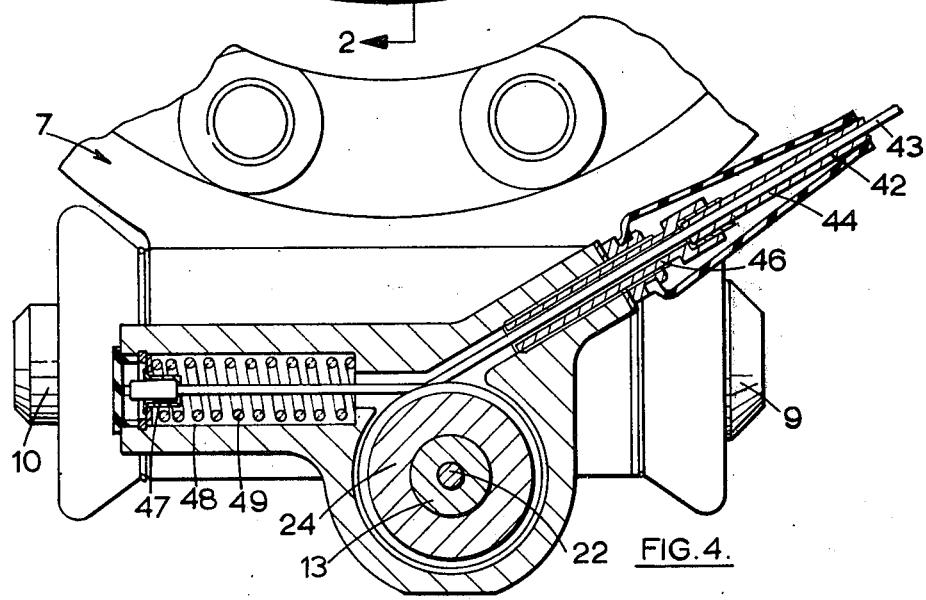
FIG. 1.
FIG. 4.

VEHICLE SHOE-DRUM BRAKES OF THE DUO-SERVO TYPE

This invention relates to internal shoe-drum brakes of the duo-servo type for vehicles, the brakes being of the kind in which arcuate primary and secondary shoes carrying friction linings for engagement with a rotatable drum are adapted to be separated at adjacent ends by an actuator, and the opposite or non-actuated adjacent shoe-ends engage with a strut assembly, the arrangement being such that when the brake is applied the primary shoe is carried round with the drum with a self energising or servo action and the thrust on the primary shoe is transmitted to the secondary shoe through the strut assembly, the secondary shoe anchoring on a fixed anchorage which takes the drag.

In known duo-servo brakes of the kind set forth the strut assembly is floatingly mounted in the brake and the shoes are simply held in engagement with opposite ends of the strut assembly by means of at least one pull-off or return spring acting either between the shoes, or between the shoes and a fixed anchorage. In the event of failure of the pull-off or return spring the shoes may disengage from the strut assembly to cause malfunction of the brake. Since the strut assembly is floatingly mounted in the brake and thus its movement in the application of the brake is determined by the direction of movement of the non-actuated shoe ends, difficulty may be experienced in effecting accurate adjustment in the effective length of the strut assembly to compensate for wear of the friction linings, at least when such adjustment takes place automatically in response to operation of adjustment means sensing relative movement between the shoes and a datum. Also the whole of the drag on the primary shoe is transmitted to the secondary shoe.

According to our invention in a duo-servo brake of the kind set forth for vehicles a fixed housing is located between the non- actuated shoe-ends, and the strut assembly is slidably guided in an open-ended through bore in the housing from which opposite ends of the strut assembly project, the length of the strut assembly being substantially greater than the maximum transverse dimension thereof.

Preferably the line of engagement of the ends of the strut assembly, which form abutments for the shoe-ends, and the shoe-ends themselves are oppositely inclined in a radial direction.

Conveniently the abutments for the shoe-ends are oppositely inclined in the said radial direction.

The strut assembly is therefore positively guided in a chordal direction when the brake is applied and is operative at all times, and limited transverse movement between the shoe-ends and the strut assembly takes place. This ensures that the friction losses which occur between the bore and the strut assembly reduce the load carried to the secondary shoe. By arranging that the length of the strut is substantially greater than its maximum transverse dimension provides a large aspect ratio and ensures that the strut assembly can slide easily in the bore. This is facilitated by the provision of the inclined abutments.

The strut assembly may comprise separate parts which are relatively rotatable to alter the effective length of the strut assembly to compensate for wear of the friction linings.

Conveniently the strut assembly comprises inner and outer threaded members of which the outer member comprises a sleeve which is guided to slide in the fixed housing and which is rotatable with respect to the inner member to alter the effective length of the assembly, and a worm wheel journalled in the housing is engageable with angularly spaced axially extending teeth in the outer face of the sleeve to rotate the sleeve relative to the inner member.

The provision of the axially extending teeth enables the strut assembly to slide in the housing in an axial direction without being impeded by the worm wheel.

The length of the axially extending teeth is chosen to accommodate full movement of the strut assembly with respect to the housing in the application of the brake whilst maintaining the worm wheel in mesh therewith.

Conveniently the axially extending teeth comprise rolled splines.

Preferably the brake incorporates transmission means for operating the worm automatically to increase the effective length of the strut assembly, the transmission means being arranged to sense relative movement between the shoes when the shoes are separated in the application of the brake.

Thus a true reading of brake shoe movement is obtained, unaffected by other factors.

Conveniently the transmission means is adapted to sense extension in the application of the brake of the extensible portion of a return spring connected between the shoes.

Preferably the transmission means comprises a flexible inextensible cable assembly comprising an inner cable connected at its free end to an abutment acting at one end on the helical portion of the return spring and an outer casing engaging at its free end with an abutment acting on the opposite end of the helical portion.

An advantage of combining the transmission means with the return spring, rather than having a separate sensor, is the avoidance of the necessity to remove a separate sensor before the return spring and shoe can be removed.

Providing that the return spring is correctly replaced on re-assembly following replacement of the shoes then the sensor will be correctly relocated between the shoes. It would be obvious to the vehicle driver if a return spring were left disconnected, whereas with a separate sensor the driver would not detect incorrect re-assembly of the sensor in the brake until the brake output was found to be limited owing to excessive actuator travel following uncompensated lining wear.

One embodiment of our invention is illustrated in the accompanying drawings in which:

FIG. 1 is a plan view of an internal shoe-drum brake of the duo-servo type with the drum omitted for clarity and including a section on the line 1—1 of FIG. 2;

FIG. 4 is a section on the line 4—4 of FIG. 3;

Figure 2:
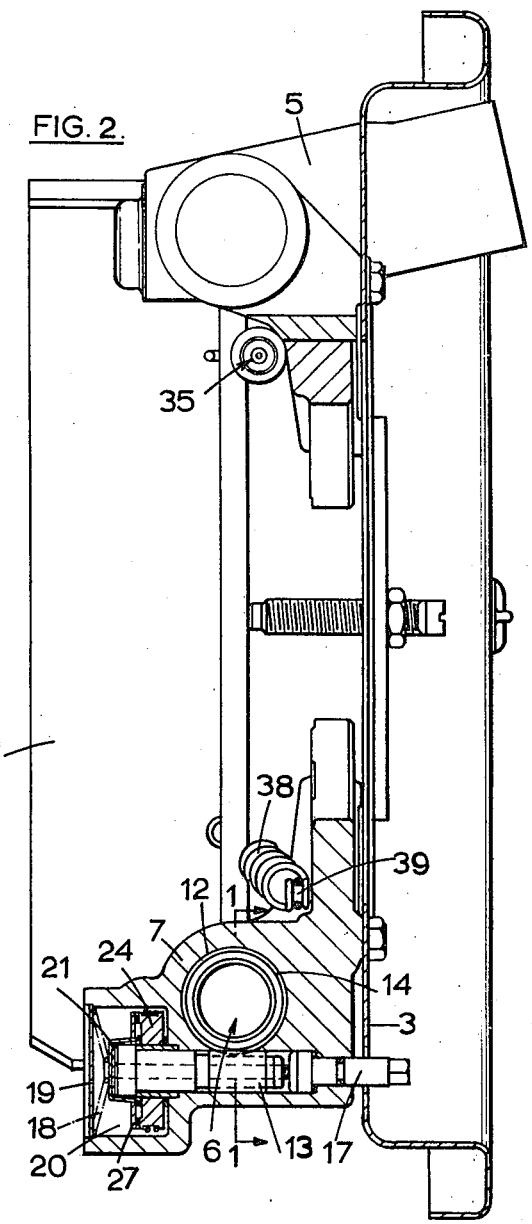
FIG. 2 is a section on the line 2—2 of FIG. 1.

The internal shoe-drum brake illustrated in the drawings comprises shoes 1 and 2 which are supported on a stationary rigid dirt shield 3 and carry friction linings 4 for engagement with a rotatable drum 3a.

At their actuated ends the shoes are adapted to be separated by an actuator 5 of the wedge expander type comprising opposed tappets engaging at their outer ends with the shoes and adapted to be separated at their inner ends by a wedge acting on the tappets through rollers. The actuator 5 is located on the dirt shield 3 and is adapted to be rigidly secured to an axle housing (not shown).

The non-actuated or opposite ends of the shoes 1 and 2 are articulated together through a thrust transmitting strut assembly 6. Thus, in the application of the brake, depending upon the direction of drum rotation, the primary shoe is carried round with the drum with a self-energising or servo-action and transmits through the strut assembly 6 a thrust to the secondary shoe which anchors on a drag-taking abutment, conveniently the housing of the actuator 5. As illustrated the strut assembly 6 is embodied in an adjuster of which a housing 7 is located on the dirt shield 3 and is adapted to be rigidly secured to an axle housing (not shown). The strut assembly 6 is slidably guided in the housing 7 in a chordal direction to transmit the thrust from the primary shoe to the secondary shoe. The strut assembly comprises an outer member in the form of a sleeve 8 acting on the shoe 2 through a tappet 9 rotatable mounted in its outer end, and an inner member 10 having a screw-threaded engagement in the sleeve 8 and acting on the shoe 1. The inner member 10 projects through a bore 11 in the housing 7 and the sleeve works in a counterbore 12. Both the tappet 9 and the inner member 10 are held against rotation by their engagement with the shoes 2 and 1.

The axis of the bore 11 is chordal with respect to the brake and a worm 13 journalled for rotation in the housing 7 about an axis parallel to that of the brake meshes with teeth 14 comprising an intermediate portion in the outer surface of the sleeve 8. The teeth 14 which comprise angularly spaced straight axially extending rolled splines are arranged to ensure that the worm 13 can mesh with them for the full travel of the sleeve 8, both longitudinally with respect to the housing 7 in the application of the brake and with respect to the inner member, so that the strut assembly can slide in the housing 7 to transmit thrust to the secondary shoe, without any tendency for the sleeve normally to rotate, except in a manner to be described.

The worm 13 is provided at one end with a radial slot 15 adapted to receive a radial blade 16 at the inner end of a re-set member 17 which is rotatable in the housing 7 and projects through an opening in the dirt shield 3. Normally the blade 16 is held out of the slot 15 by means of a compression spring 18 acting between an end closure 19 for a recess 20 of increased diameter into which the worm 13 projects and a bridge member 21 of top-hat section. The bridge member 21 acts on a push-rod 22 which works through a longitudinally extending bore 23 in the worm 13 and engages at the inner end of the blade 16.

Figure 5:
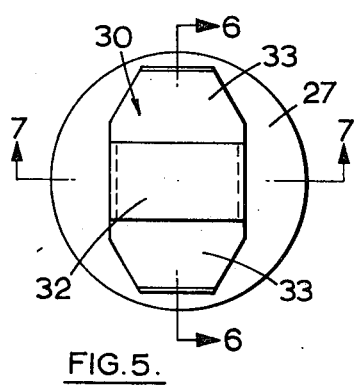
FIG. 5 is an enlarged end view of the ratchet assembly.
Figure 6:
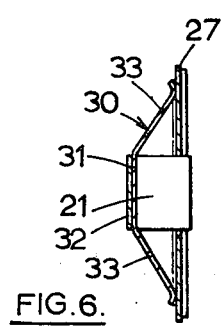
FIG. 6 is a section on the line 6—6 of FIG. 5.
Figure 7:
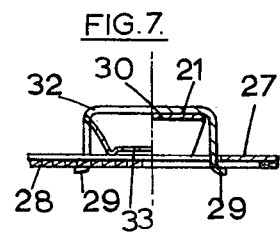
FIG. 7 is a composite view comprising a part section on the line 7—7 of FIG. 5 together with a side elevation of the ratchet assembly.
Figure 3:
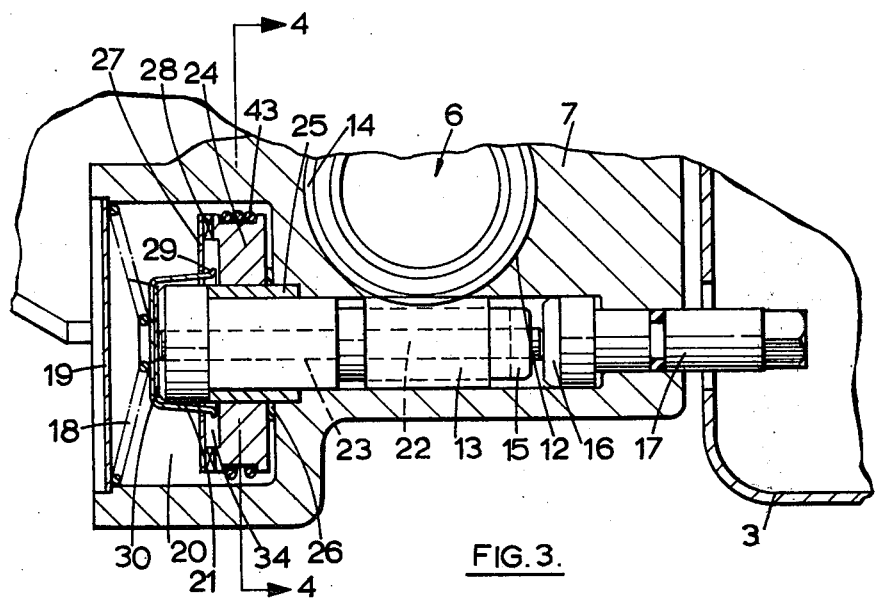
FIG. 3 is a portion of FIG. 2 drawn on an enlarged scale.

A drum 24 is rotatable with respect both to a sleeve 25, enclosing the end of the worm 13 remote from the slot 15, and to a bearing 26, and the drum 24 is keyed to the worm 13 for rotation in one direction by means of ratchet plate 27 of a ratchet assembly shown in detail in FIGS. 5 to 7. The clutch plate 27 and the drum 24 are provided in their mating faces with complementary interengaging teeth 28 permitting relative rotation therebetween in one direction only and the space between adjacent teeth is chosen so as to correspond with the desired running brake clearances.

The ratchet assembly comprises the bridge member 21 of which the ends 29 are turned under the ratchet plate 27, and a plate spring 30 which presses at its centre 31 against the underside of the central part 32 of the bridge member 21 and has a pair of arms 33 which urge the ratchet plate 27 into engagement with the ends 29 of the bridge member.

The plate spring 30 provides the force which normally holds the ratchet teeth 28 of the plate 27 in engagement with those of the drum 24.

The spring 18 also holds the bridge member 21 in engagement with an annular recess 34 in the end face of the drum 24 and, in turn, the sleeve 25 against the end of the worm 13.

The shoes 1 and 2 are held in an operative position spaced from the drum by a chordal return spring 35 located adjacent to the actuator 5 and having a central helical coiled portion 36 connected to each shoe by an inextensible connecting portion 37, and a pair of return springs 38 adjacent the housing 7, each connected at its inner end to common anchorage 39 on the dirt shield 3. The helical portion 36 is enclosed at opposite ends between spaced abutment plates 40 and 41, each of generally tophat section having a radial flange engaging with an end coil, and a central sleeve extending into the coils.

Transmission means comprising an inextensible cable assembly 42 is connected between the abutment plate 40 and 41. The cable assembly comprises an inner cable 43 slidably enclosed within a flexible casing 44 and carrying at one end a thickening 45 acting on the abutment plate 40. The adjacent end of the casing acts on the other abutment plate 41. The opposite end of the casing 44 is received in an abutment sleeve 46 in the housing 7, and the cable 43 completes at least one complete turn around the drum 24, carrying at its free end an abutment plate 47 which is guided to slide in a bore 48 in the housing 7 and on which acts a compression spring 49 to hold the cable in engagement with the drum 24 and augment a force in the return springs 36 and 38.

When the brake is applied as described above the cable 43 and the casing 44 move relative to each other in opposite directions and the drum 24 is rotated with respect to the ratchet plate 27 and against the force in the compression spring 49.

When the relative movement between the drum 24 and the ratchet plate 27 in the application of the brake exceeds the spacing between adjacent teeth, the ratchet plate 27 is displaced against the force of the plate spring 30 to permit the drum 24 to rotate relative to it over one tooth pitch. Upon release of the brake the stored energy in the compression spring 49 applies to the drum 24 a force of sufficient magnitude to rotate the worm 23 through the ratchet plate 27. This in turn rotates the sleeve 8 relative to the inner member 10 and the tappet 9 to increase the effective length of the strut assembly.

This advances the shoes 1 and 2 towards the drum to compensate for wear of the friction linings 4 and maintain the braking clearances at a constant value.

To replace brake shoes, particularly when grooves have been worn in the drum, the adjuster can be wound back to decrease the effective length of the strut assembly 6. This is achieved by urging the re-set member 17 inwardly to engage the blade 16 in the slot 15, simultaneously displacing the rod 23 axially to urge the bridge member 21 away from the drum 24 to disengage the ratchet plate 27 from the drum 24 against the force in the spring 18. Thereafter the re-set member 17 can be rotated to rotate the sleeve 8.

In the construction described above the length of the sleeve 8 greatly exceeds its diameter. This provides a large aspect ratio and enables the sleeve 8 to slide easily with respect to the housing 7. Angled abutments are provided between the shoe-ends and the tappet 9 and the inner member 10 respectively. This is achieved by the provision of the inner ends of the tappet 9 and the innermember 10 which acts as a tappet of oppositely inclined straight radial abutment surfaces 50 at the base of slots in which the webs of the shoes 1 and 2 are received. The provision of the said "angled abutments" enables the friction loss between the sleeve 8 and the housing 7 to reduce the load carried to the secondary shoe.

In a modification the actuator 5 may comprise an hydraulic cylinder.

I claim:

1. A vehicle brake of the duo-servo type comprising arcuate primary and second shoes carrying friction linings for engagement with a rotatable drum and having adjacent actuated ends and adjacent non-actuated ends, an actuator for separating said actuated ends to apply the brake, a strut assembly having opposite ends defining shoe abutments with which said non-actuated ends engage and which are spaced apart in a longitudinal direction by a longitudinal dimension substantially greater in length than the length of a maximum transverse dimension of said strut assembly normal to said longitudinal dimension, a housing fixed between said non-actuated ends and having an open-ended through bore in which said strut assembly is slidably guided bodily and from which said opposite ends of said strut assembly project to transmit a thrust from said primary shoe to said secondary shoe when said primary shoe is carried round with said drum in the application of the brake with said strut assembly sliding bodily in and with respect to said housing, and anchorage for engagement by said actuated end of said secondary shoe to take drag on said shoes in the application of the brake, wherein said strut assembly comprises threadably engaged members which are relatively rotatable to increase the effective length of said strut assembly to compensate for wear of said friction linings, a worm wheel is incorporated for effecting relative rotation of said members, and transmission means are incorporated for operating said worm wheel automatically to increase the effective length of said strut assembly, said transmission means being arranged to sense relative movement between said shoes when said shoes are separated in the application of the brake.

2. A duo-servo brake as claimed in claim 1, wherein the line of engagement of said abutments and said non-actuated ends are oppositely inclined in a radial direction.

3. A duo-servo brake as claimed in claim 2, wherein said abutments are themselves oppositely inclined in the radial direction.

4. A duo-servo brake as claimed in claim 1, wherein said strut assembly comprises separate parts which are relatively rotatable to alter the effective length of said strut assembly to compensate for wear of said friction linings.

5. A duo-servo brake as claimed in claim 1, wherein said threadably engaged members comprise inner and outer threaded members of which said outer member comprises a sleeve having an outer face, and angularly spaced axially extending teeth are provided in said outer face, said sleeve being guided to slide in said open-ended through bore and being rotatable relative to said inner member to alter the effective length of said strut assembly, and said worm wheel is journalled in said housing and is engageable with said teeth to rotate said sleeve relative to said inner member.

6. A duo-servo brake as claimed in claim 5, wherein the length of said sleeve is substantially greater than the diameter thereof.

7. A duo-servo brake as claimed in claim 5, wherein the length of said axially extending teeth is chosen to accommodate full movement of said strut assembly with respect to said housing in the application of the brake whilst maintaining said worm wheel in mesh therewith.

8. A duo-servo brake as claimed in claim 5, wherein the axially extending teeth comprise rolled splines.

9. A duo-servo brake as claimed in claim 1, wherein said transmission means is adapted to sense extension in the application of the brake of an extensible portion of a return spring connected between said shoes.

10. A vehicle brake of the duo-servo type comprising arcuate primary and secondary shoes carrying friction linings for engagement with a rotatable drum and having adjacent actuated ends and adjacent non-actuated ends, an actuator for separating said actuated ends to apply the brake, a strut assembly having opposite ends defining shoe abutments with which said non-actuated ends engage and which are spaced apart in a longitudinal direction by a longitudinal dimension substantially greater in length than the length of a maximum transverse dimension of said strut assembly normal to said longitudinal dimension, a housing fixed between said non-actuated ends and having an open-ended through bore in which said strut assembly is slidably guided and from which said opposite ends of said strut assembly project to transmit a thrust from said primary shoe to said secondary shoe when said primary shoe is carried round with said drum in the application of the brake, an anchorage for engagement by said actuated end of said secondary shoe to take drag on said shoes in the application of the brake, said strut assembly comprising inner and outer threaded members of which said outer member comprises a sleeve having an outer face, angularly spaced axially extending teeth provided in said outer face, said sleeve being guided to slide in said open-ended through bore and being rotatable relative to said inner member to alter the effective length of said strut assembly, and a worm wheel journalled in said housing and engageable with said teeth to rotate said sleeve relative to said inner member, and transmission means for operating the worm automatically to increase the effective length of said strut assembly, said transmission means being arranged to sense relative movement between said shoes when the shoes are separated in the application of the brake and comprising a flexible inextensible cable assembly comprising an inner cable having a free end, and an outer casing in which said inner cable is slidably guided and having a free end, and a return spring acting between said shoes has a helical portion having opposite ends, a first abutment connected to said free end of said inner cable and acting on one of said opposite ends of said helical portion, and a second abutment with which said free end of said outer casing is engagable and acting on the other of said opposite ends of said helical portion.

11. A duo-servo brake as claimed in claim 10, including a drum adapted to be rotated by said cable assembly, a ratchet assembly coupling said drum to said worm, said ratchet assembly comprising a clutch plate located adjacent to said worm, said clutch plate and said worm having mating faces, and interengaging teeth in said mating faces permitting relative rotation therebetween in one direction only with the spacing between adjacent teeth chosen to correspond to a desired brake running clearance, resilient means in which energy is stored when the brake is applied and which is released to rotate said worm to increase the effective length of said strut assembly when rotation of said drum exceeds the said spacing and said drum rotates relative to said worm and said clutch plate over one tooth pitch.

12. A duo-servo brake as claimed in claim 11, incorporating a plate spring for urging said teeth in said clutch plate and said drum into engagement.

* * * * *